United States Patent
Basterash (10) Patent No.: US 10,528,015 B2
(45) Date of Patent: Jan. 7, 2020

(54) BUILDING AUTOMATION SYSTEM CONTROLLER WITH REAL TIME SOFTWARE CONFIGURATION AND DATABASE BACKUP

(71) Applicant: Trane International Inc., Davidson, NC (US)

(72) Inventor: Thomas Christopher Basterash, White Bear Lake, MN (US)

(73) Assignee: Trane International Inc., Davidson, NV (US)

( * ) Notice: Subject to any disclaimer, the term of this patent is extended or adjusted under 35 U.S.C. 154(b) by 274 days.

(21) Appl. No.: 15/380,238

(22) Filed: Dec. 15, 2016

(65) Prior Publication Data

US 2018/0173179 A1 Jun. 21, 2018

(51) Int. Cl.
*G05B 19/042* (2006.01)
*G05B 15/02* (2006.01)

(52) U.S. Cl.
CPC ........... *G05B 19/042* (2013.01); *G05B 15/02* (2013.01); *G05B 2219/2614* (2013.01); *G05B 2219/2642* (2013.01)

(58) Field of Classification Search
CPC .................. G05B 19/042; G05B 15/02; G05B 2219/2614; G05B 2219/2642
USPC ........................................................ 700/275
See application file for complete search history.

(56) References Cited

U.S. PATENT DOCUMENTS

| | | |
|---|---|---|
| 5,086,502 A | 2/1992 | Malcolm |
| 5,212,784 A | 5/1993 | Sparks |
| 5,404,508 A | 4/1995 | Konrad et al. |
| 5,604,862 A | 2/1997 | Midgely et al. |
| 5,729,735 A | 3/1998 | Meyering |
| 5,819,020 A | 10/1998 | Beeler, Jr. |
| 6,289,357 B1 | 9/2001 | Parker |
| 6,847,983 B2 | 1/2005 | Somalwar et al. |
| 7,051,053 B2 | 5/2006 | Sinha |
| 7,743,028 B1 | 6/2010 | Stringham et al. |
| 7,844,577 B2 | 11/2010 | Becker et al. |
| 8,005,797 B1 | 8/2011 | Chepel et al. |
| 8,825,600 B2 | 9/2014 | Shin et al. |
| 8,935,208 B2 | 1/2015 | Brown et al. |
| 10,152,487 B1* | 12/2018 | Patwardhan ...... G06F 17/30156 |
| 2003/0110371 A1 | 6/2003 | Yang et al. |
| 2005/0010835 A1 | 1/2005 | Childs et al. |
| 2005/0228836 A1 | 10/2005 | Bacastow et al. |
| 2007/0079089 A1 | 4/2007 | Ohran et al. |
| 2012/0143827 A1* | 6/2012 | Brown ................ G06F 11/1458 707/654 |
| 2015/0199375 A1 | 7/2015 | Prahlad et al. |
| 2016/0132288 A1* | 5/2016 | Lindahl ................ G06F 1/3215 700/94 |
| 2016/0327921 A1* | 11/2016 | Ribbich .................. F24F 11/30 |

(Continued)

*Primary Examiner* — Fernando Hidalgo
(74) *Attorney, Agent, or Firm* — The Salerno Law Firm, P.C.

(57) ABSTRACT

A building automation system (BAS) controller configured for use in a BAS is disclosed. The BAS controller includes an internal storage device for storing a first type of data and a second type of data, and a processor in operative communication with the internal storage device. The BAS controller is configured to automatically store the first type of data and the second type of data to the internal storage device and the second type of data to an external storage device.

20 Claims, 3 Drawing Sheets

(56) References Cited

U.S. PATENT DOCUMENTS

| | | | |
|---|---|---|---|
| 2017/0070395 A1* | 3/2017 | Ansari | G06Q 30/04 |
| 2018/0087793 A1* | 3/2018 | Okita | F24F 11/30 |
| 2018/0329055 A1* | 11/2018 | Lee | G01S 15/02 |

* cited by examiner

BUILDING AUTOMATION SYSTEM CONTROLLER WITH REAL TIME SOFTWARE CONFIGURATION AND DATABASE BACKUP

BACKGROUND

1. Technical Field

The present disclosure relates generally to a building automation system (BAS), and more particularly, to BAS controllers which provide automated real time software configuration and database backup.

2. Background of Related Art

BAS controllers, such as the Tracer SC™ controller manufactured by Trane International Inc. of Davidson, N.C., USA, are used to coordinate, manage, and automate control of diverse environmental, physical, and electrical building subsystems, particularly heating ventilation and air conditioning (HVAC) and climate control. The BAS controller can be hardwired or use a proprietary communication standard or protocol to link the various subsystems and provide system-wide user access, monitoring, and control. Alternatively, some BAS controllers can be battery-powered and can be configured for wireless communication.

Various data, e.g., factory default settings, firmware updates, diagnostic data, software configuration data, one or more databases, etc., can be used by the BAS controller, thereby allowing the BAS controller to manage/control one or more components associated with or connected to the BAS.

The aforementioned data can be stored on a component of the BAS controller (and/or the BAS) and can be backed up at set or specific times, typically manually initiated or performed on a set schedule, which can be time consuming and can require a majority of processor and storage resources of the BAS controller. The backed up data is typically stored internally on a solid state device, such as a NAND flash chip, and can be used if the BAS controller or the BAS becomes inoperable.

For example, if the BAS controller experiences failure that requires the BAS controller to be returned to its factory default settings (or if the hardware needs to be replaced), the most recent backup can manually be restored to the BAS controller. As can be appreciated, however, depending on when the most recent backup was performed, the backed up data can be days, weeks, or even months/years old. If the backup process is supposed to be performed manually, the possibility exists that the data was not backed up at all. This scenario, in turn, could result in a complete loss of configuration and database information, thereby resulting in the configuration and database information having to be re-created by a user without the benefit of any previously backed up data for assistance, i.e., re-created from scratch.

SUMMARY

In view of the above, a BAS controller which provides automated real time software configuration and database backup may prove useful in the HVAC industry.

In accordance with an aspect of the present disclosure, there is provided a BAS controller that is configured for use in a BAS. The BAS controller includes an internal storage device for storing a first type of data and a second type of data and a processor in operative communication with the internal storage device and configured to automatically store the first type of data and the second type of data to the internal storage device and the second type of data to an external storage device. The second data can be automatically stored to the internal storage device and the external storage device when a change in the second data occurs. The second data can be encrypted prior to being stored to the external storage device.

The first type of data can be operating system data including information relating to drivers of the operating system, information relating to the operating system kernel, low level files, and support features and libraries, and the second type of data can be configuration and database information including one of application configuration information, device configuration information, alarm history, data history, and link configuration.

The internal storage device can be a memory of the BAS controller, and the external storage device can be a secure digital (SD) card including an embedded MultiMediaCard (eMMC) chip.

In accordance with another aspect of the present disclosure, there is provided a method of operating a BAS using a BAS controller. The method includes determining when a change in second data occurs and when a change in second data occurs, automatically storing first data and the second data to an internal storage device of the BAS controller and storing at least one of the first data and/or the second data to an external storage device. The first data and/or the second data can be encrypted prior to storing it to the external storage device.

Automatically storing the first data to the internal storage device can include storing operating system data including information relating to drivers of the operating system, information relating to the operating system kernel, low level files, and support features and libraries and storing the second data to the external storage device includes storing configuration and database information including one of application configuration information, device configuration information, alarm history, data history, and link configuration.

The method can include using a memory of the BAS controller for the internal storage device and using a secure digital (SD) card including an embedded MultiMediaCard (eMMC) chip for the external storage device.

In accordance with yet another aspect of the present disclosure, a BAS incorporates a BAS controller having an internal storage device for storing a first type of data and a second type of data and a processor in operative communication with the internal storage device and configured to automatically store the first type of data and the second type of data to the internal storage device and the second type of data to an external storage device. The second data can be automatically stored to the internal storage device and the external storage device when a change in the second data occurs. The second data can be encrypted prior to being stored to the external storage device.

The first type of data can be operating system data including information relating to drivers of the operating system, information relating to the operating system kernel, low level files, and support features and libraries, and the second type of data can be configuration and database information including one of application configuration information, device configuration information, alarm history, data history, and link configuration.

The internal storage device can be a memory of the BAS controller, and the external storage device can be a secure digital (SD) card including an embedded MultiMediaCard (eMMC) chip.

BRIEF DESCRIPTION OF THE DRAWINGS

Various embodiments of the disclosed system and method are described herein with reference to the drawings wherein.

The various aspects of the present disclosure mentioned above are described in further detail with reference to the aforementioned figures and the following detailed description of exemplary embodiments.

DETAILED DESCRIPTION

The systems and methods disclosed herein may be advantageously employed in building automation systems such as those disclosed in U.S. Pat. No. 8,050,801, filed Aug. 22, 2005, issued Nov. 1, 2011, and entitled "Dynamically Extensible and Automatically Configurable Building Automation System and Architecture"; U.S. Pat. No. 8,099,178, filed Dec. 22, 2005, issued Jan. 17, 2012, and entitled "Building Automation System Facilitating User Customization"; U.S. Pat. No. 7,904,186, filed Dec. 22, 2005, issued Mar. 8, 2011, and entitled "Building Automation System Facilitating User Customization"; U.S. Pat. No. 8,024,054, filed Dec. 22, 2005, issued Sep. 20, 2011, and entitled "Building Automation System Facilitating User Customization"; U.S. Pat. No. 7,870,090, filed Dec. 22, 2005, issued Jan. 11, 2011, and entitled "Building Automation System Data Management"; U.S. Pat. No. 8,055,386, filed Dec. 22, 2005, issued Nov. 8, 2011, and entitled "Building Automation System Data Management"; U.S. Pat. No. 8,055,387, filed Dec. 22, 2005, issued Nov. 8, 2011, and entitled "Building Automation System Data Management"; U.S. Pat. No. 7,917,232, filed Dec. 22, 2005, issued Mar. 29, 2011, and entitled "Building Automation System Data Management"; and U.S. Pat. No. 8,290,627, filed Dec. 22, 2005, issued Oct. 16, 2012, and entitled "Dynamically Extensible and Automatically Configurable Building Automation System and Architecture," all of which are assigned to the applicant of the present disclosure, and are incorporated by reference herein for all purposes.

Particular illustrative embodiments of the present disclosure are described hereinbelow with reference to the accompanying drawings; however, the disclosed embodiments are merely examples of the disclosure, which may be embodied in various forms. Well-known functions or constructions and repetitive matter are not described in detail to avoid obscuring the present disclosure in unnecessary or redundant detail. Therefore, specific structural and functional details disclosed herein are not to be interpreted as limiting, but as a basis for the claims and examples for teaching one skilled in the art to variously employ the present disclosure in any appropriately-detailed structure. In this description, as well as in the drawings, like-referenced numbers represent elements which may perform the same, similar, or equivalent functions. The word "exemplary" is used herein to mean "serving as a non-limiting example, instance, or illustration." Any embodiment described herein as "exemplary" is not necessarily to be construed as preferred or advantageous over other embodiments. The word "example" may be used interchangeably with the term "exemplary."

Aspects of the present disclosure are described herein in terms of functional block components and various processing steps. It should be appreciated that such functional blocks configured to perform the specified functions may be embodied in mechanical devices, electromechanical devices, analog circuitry, digital circuitry, and/or modules embodied in a computer. For example, the present disclosure may employ various discrete components, integrated circuit components (e.g., memory elements, processing elements, logic elements, look-up tables, and the like) which may carry out a variety of functions, whether independently, in cooperation with one or more other components, and/or under the control of one or more processors or other control devices. One skilled in the art will also appreciate that, for security reasons, any element of the present disclosure may includes any of various suitable security features, such as firewalls, access codes, authentication, encryption, de-encryption, compression, decompression, and/or the like. It should be understood that the steps recited herein may be executed in any order and are not limited to the order presented. Moreover, two or more steps or actions recited herein may be performed concurrently.

As noted above, a BAS controller which provides automated real time software configuration and database backup may prove useful in the HVAC industry, and such a device is now herein described.

Figure 1:
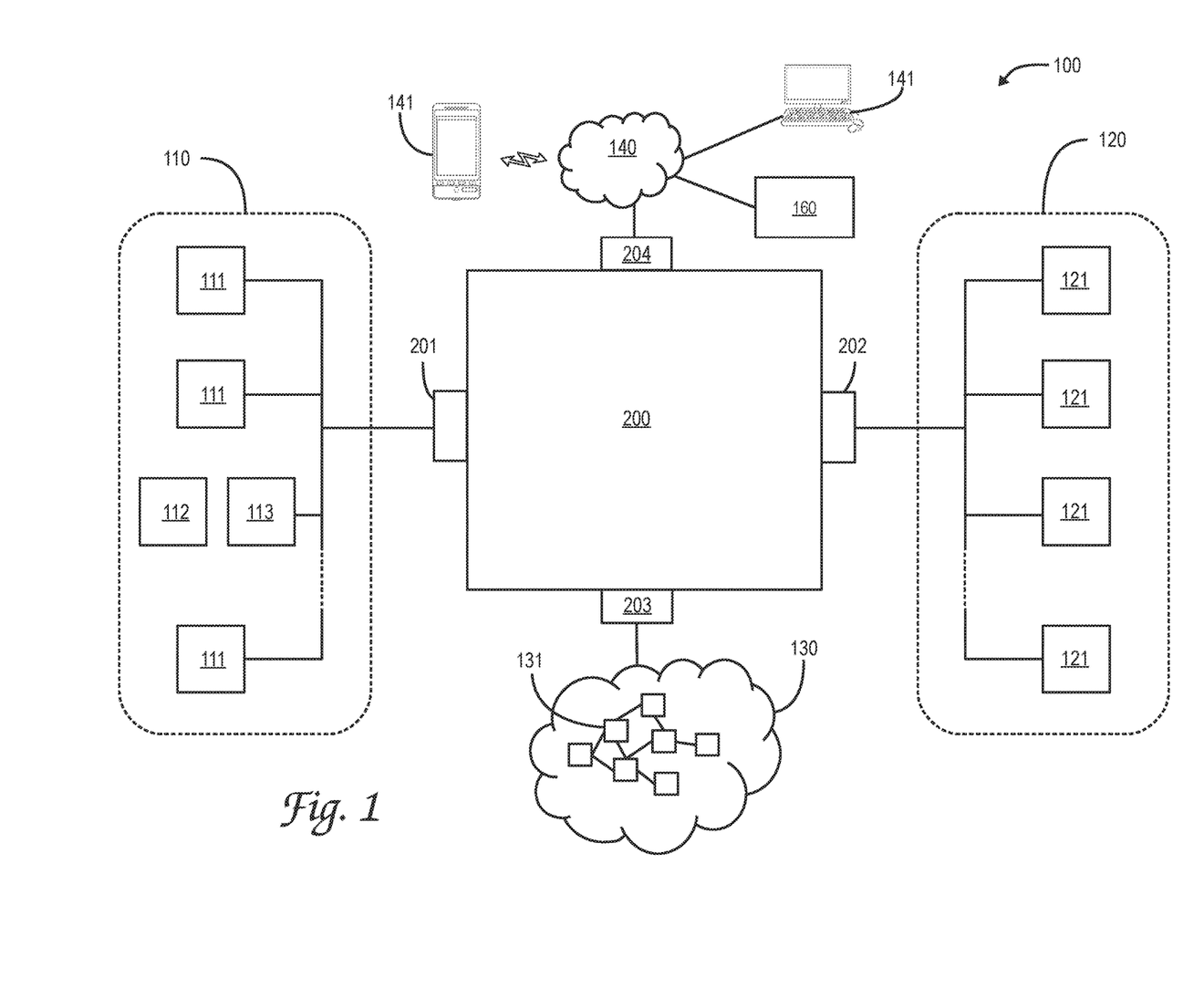
FIG. 1 is a diagram of a BAS, in accordance with an embodiment of the present disclosure.

FIG. 1 is a diagram illustrating a BAS 100, according to an embodiment of the present disclosure. The BAS 100 includes a BAS controller 200 that is in operative communication with an external storage device for automatically performing a backup operation of configuration and database information, as described in greater detail below.

Continuing with reference to FIG. 1, the BAS controller 200 can be communicatively coupled with a number of building automation networks (BAN) 110, 120, 130 which facilitate communication between the BAS controller 200 and any number of BAS end devices 111, 112, 113, 121, and 131. The end devices 111, 112, 113, 121, and 131 of BAS 100 may include a range of devices including, but not limited to, complex HVAC equipment such as chillers, air handlers, furnaces, or boilers with multiple data sensors producing a continuous stream of data, variable air volume (VAV) boxes and dampers, to simple temperature or humidity sensors monitoring an office, a classroom, factory, or external weather conditions.

The BAS controller 200 can be equipped with a BACnet communications interface 201 which couples BAS controller 200 to BACnet building automation network 110. The BACnet 110 operates using the BACNet protocol promulgated by the American National Standards Institute (ANSI) and the American Society of Heating, Refrigerating and Air-Conditioning Engineers (ASHRAE). BACnet is a master-slave token passing (MSTP) protocol implemented on an RS485/EIA485 physical layer. The present disclosure may be employed with BACnet building automation networks operating according to any BACnet standard now or in the future known, including without limitation, ANSI/ASHRAE Standard 135-1995, ANSI/ASHRAE Standard 135.1-2003, ANSI/ASHRAE Standard 135-2004, ANSI/ASHRAE Standard 135.1-2007, and BACnet-2008.

The BAS controller 200 is equipped with a LON communications interface 202 which couples BAS controller 200 to a LON building automation network 120. LON network 120 operates according to the LONTalk® protocol standard promulgated by Echelon Corp of Santa Clara, Calif., USA. LON 120 includes a number of LONTalk®-capable networked end devices 121.

The BAS controller 200 includes a ZigBee® communications interface 203 which couples the BAS controller 200 to a Zigbee® building automation network 130. ZigBee® network 130 is a wireless mesh network that operates in accordance with standards published by The ZigBee Alliance of San Ramon, Calif., USA.

The BAS controller 200 includes a data network interface 204 such as an Ethernet interface and/or an 802.11 WiFi interface for communicating with one or more user devices 141, BACnet devices, and/or BAS devices over a data network 140, such as a private LAN and/or the public Internet. User devices 141 may include, without limitation, a mobile telephone, smart phone, tablet device, smart watch, pager, notebook computer, and/or a desktop computer.

A remote server 160 is communicatively coupled to the BAS controller 200 via data network 140 and stores information for a plurality of end devices, including information relating to specific products, product versions, firmware versions, software versions and/or data backups. Remote server 160 may be configured to store data relating to BAS controller 200 such as downloadable firmware/software updates and backup data, and to monitor and control access to said firmware/software updates and backup data. The remote server 160 may comprise distributed computing and storage elements in a cloud-based configuration.

Figure 2:
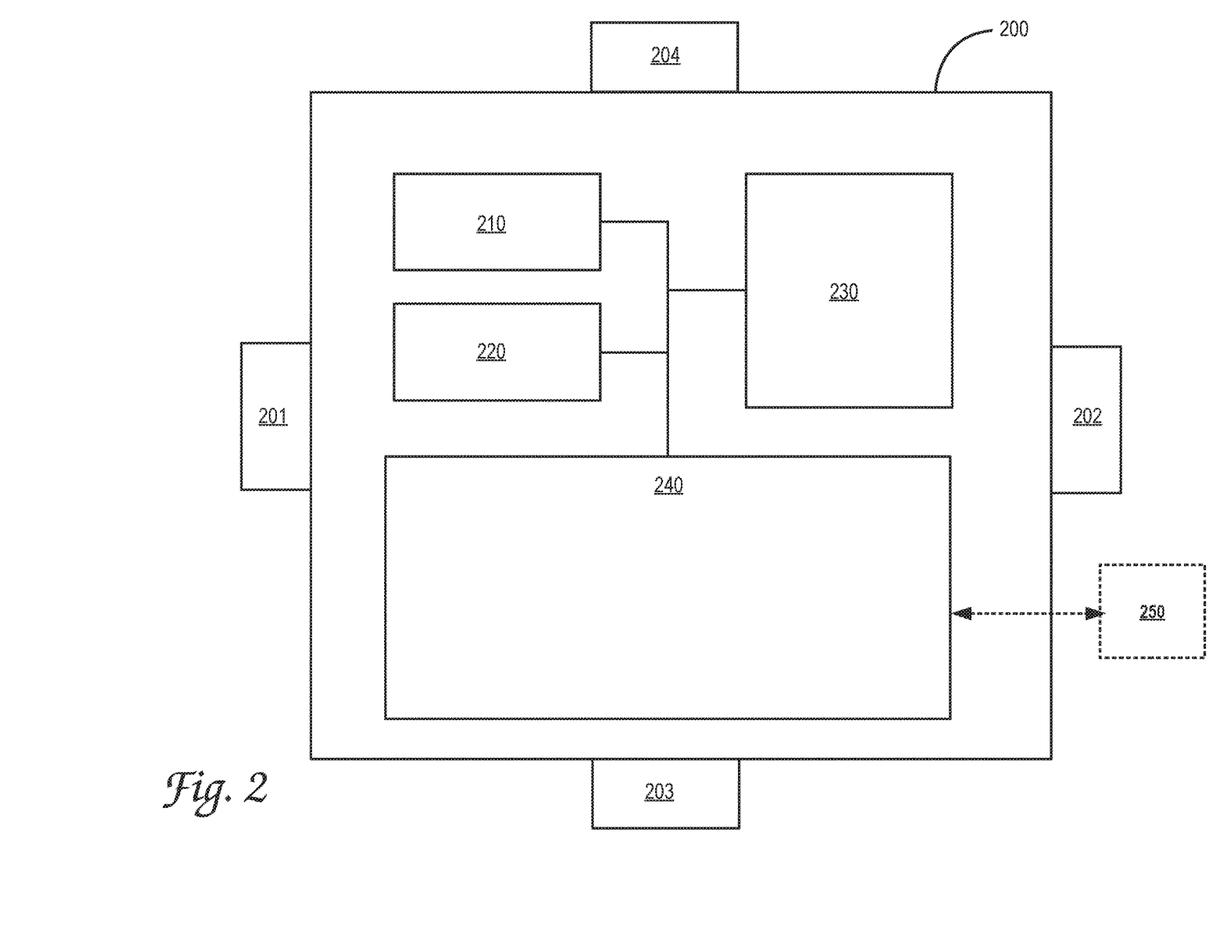
FIG. 2 is a diagram of a BAS controller, in accordance with an embodiment of the present disclosure.

Referring now to FIG. 2, the BAS controller 200 includes a processor 210 in operative communication with a memory 220, a user interface 230, a data storage unit 240 (e.g., an internal storage device), and an external storage device 250 that is connectable to the BAS controller.

The memory 220 includes RAM memory which can be used, for example, for storage of a first type of data such as transient data, computed and intermediate results, I/O buffering, graphical user interface (GUI) buffering, program execution, and other purposes familiar to the skilled artisan.

Data storage unit 240 comprises non-volatile storage such as a NAND flash drive, EEPROM, ROM, magnetic hard disk, solid state disk (SSD), hybrid drives (combination hard disk/SSD) which can be used for storage of a second type of data which persists through power cycling. The data storage unit 240 stores operating system information, which can include, without limitation, information relating to the drivers of the operating system, low level files, configuration, and so forth. Operating system information can include information relating to components such as the operating system kernel (e.g., linux kernel), underlying file system and components (e.g., BusyBox™) various drivers (e.g., serial interface drivers, universal serial bus (USB) component drivers, etc.), and support features and libraries (e.g., OpenSSL, PAM authentication, etc.). The data storage unit 240 also stores database information that is received from the processor 210 when the processor 210 performs a backup operation. The backup operation is automatically performed by the processor 210 when a change to or an update of the configuration and database information occurs. The database information can include application configuration information (e.g., applications such as chiller plant control, area control, scheduling, etc.), device configuration information (e.g., how the aforementioned external devices on the communication links are configured and mapped), alarm history (e.g., a history of alarms and notifications), data history (e.g., a history of various data points that are being trended over time), link configuration (e.g., how the various links are configured), and so forth.

During the backup operation the processor 210 also transmits the configuration and database information to the external storage device 250. The external storage device 250 can be any suitable type of non-volatile storage media. In the illustrated embodiment, for example, the external storage device 250 is a secure digital (SD) card that includes an embedded MultiMediaCard (eMMC) chip, or the external storage device 250 can be a USB Flash Drive or other type of storage device. In the event of a system failure of the BAS 100 and/or the BAS controller 200, the external data storage device 250 can be removed from the BAS controller 200 and inserted into a new BAS controller or BAS, thereby bringing the new BAS controller or BAS into operation at the exact point where the old BAS controller or BAS failed or became inoperable. In some embodiments, during a backup operation, processor 210 transmits the configuration and database information to remote server 160. During a restore operation, processor 210 receives the configuration and database information from remote server 160

The user interface 230 includes a number of elements which facilitate user input and the display of output to the user, and may include any one, some, or all of buttons, switches, LED indicators, a character display such as a liquid crystal display (LCD) or a vacuum fluorescent display (VFD), a graphic display such as a thin film transistor (TFT) display, a touchscreen display, and so forth. Non-limiting examples of suitable user interface devices include a Trane Tracer AdaptiView™ and a Trane Tracer® Concierge™. The user interface 230 displays one or more GUIs that are configured to receive one or more user inputs for when a user needs to remove (or install) the external storage device 250 from the BAS controller 200 or the BAS 100.

Figure 3:
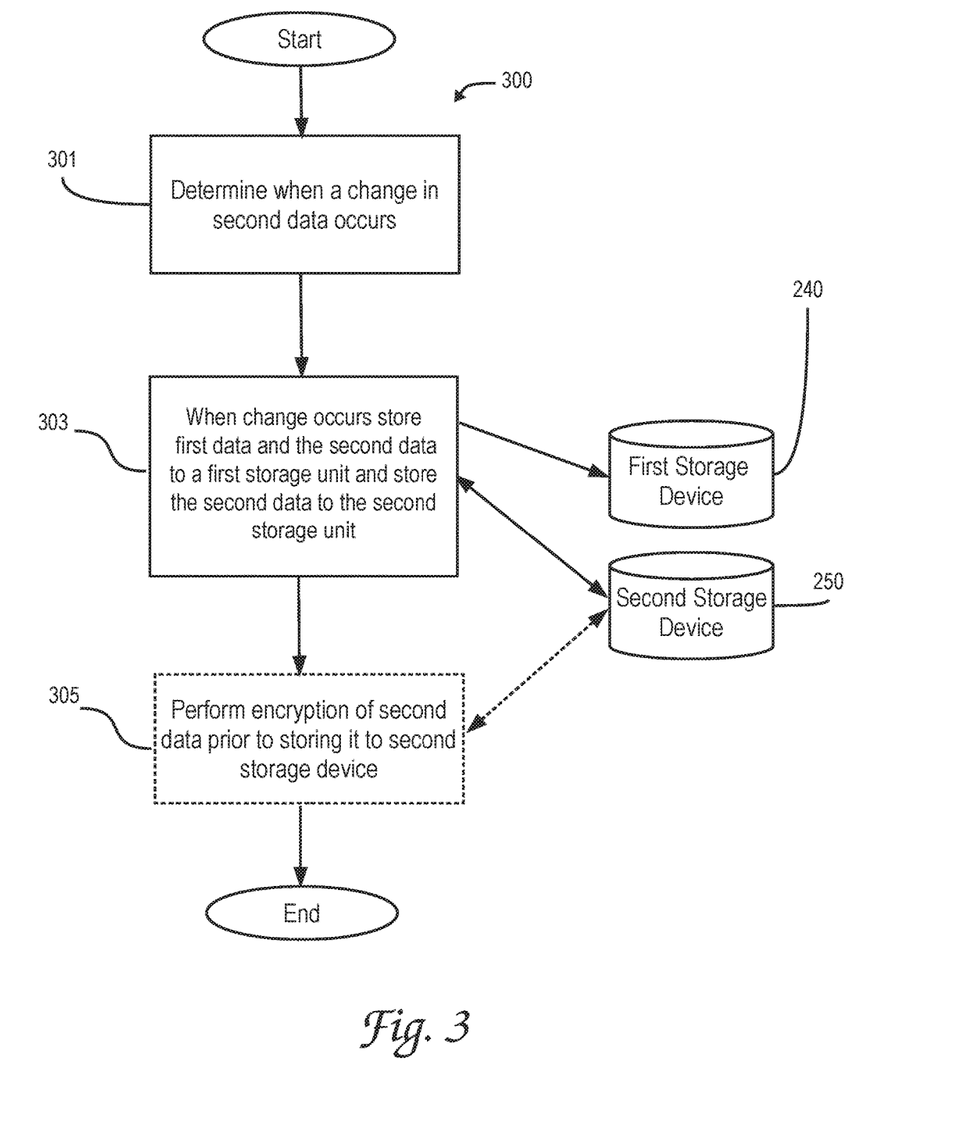
FIG. 3 is a flowchart of a method for operating the BAS, in accordance with an embodiment of the present disclosure.

FIG. 3 is a flowchart of a method 300 for operating the BAS 100, in accordance with an embodiment of the present disclosure.

At step 301, the processor 210 of the BAS controller 200 determines when a change to the configuration and/or the database (second data) occurs. When the change to the configuration and/or database occurs, at step 303 the processor 210 stores the operating system information and the configuration and database information to the data storage unit 240, and stores the configuration and database information to the external storage device 250. In certain instances, it may prove advantageous to encrypt the configuration and database information prior to storing this information to the external storage device 250. Accordingly, at optional step 305, the configuration and database information may be encrypted prior to being stored to the external storage device 250.

In some embodiments of the present disclosure, a filesystem is maintained on external storage device 250 which replicates a portion of the filesystem of data storage unit 240 which is designated for real-time backup, e.g., those directories and files of data storage unit 240 in which configuration and database information is stored. Those directories of data storage unit 240 which contain no configuration or database information are not replicated on external storage device 250, and only those files which contain configuration or database information are replicated within a replicated directory.

In some embodiments of the present disclosure, changes to a second type of data stored to data storage unit 240 are detected by the file system driver associated with data storage unit 240, such as a software hook which intercept a device write command which, in turn, initiates storing the changed information to external storage device 250. In some embodiments where BAS controller 200 utilizes a linux-based operating system, BAS controller 200 employs inotify and/or incrond to initiate storing the changed information to external storage device 250.

In the event of failure of the BAS 100 and/or the BAS controller 200, a user can remove the external storage device 250 from the BAS controller 200 and install/insert the external storage device 250 into a new BAS controller, at which time the new BAS controller will read the configuration and database information stored on the external storage device 250 and use this information for configuring or setting up the new BAS controller. In some embodiments, a user may dismount external storage device 250 from a first BAS controller 200 using a GUI displayed on user interface 230, and, use a GUI displayed on user interface 230 of a second BAS controller 200 to mount the external storage device 250 and transfer the contents thereof into data storage unit 240 of the second BAS controller 200.

In accordance with the present disclosure, in contrast to conventional BASs that require a backup operation be performed manually (or set up based on a periodic schedule), the backup operation of the configuration and database information described herein is performed automatically in real time as part of the normal operation of the BAS 100. Additionally, by backing up the configuration and database information in real time (as opposed to a periodic basis), load on the BAS 100 (including time, processor and storage resources) is greatly reduced. Moreover, by having the configuration and database information backed up in real time, this information always has an up to date backup. Therefore, in the event of BAS 100 or BAS controller 200 failure, concerns as to whether the backed up data is "up to date" are not an issue. Furthermore, backing up the configuration and database information to a removable device (e.g., an SD card) and or a remote server 160 provides an easy and efficient way to move this information to a new BAS or BAS controller, in the event of a failure of a BAS and/or the BAS controller.

From the foregoing and with reference to the various figure drawings, those skilled in the art will appreciate that certain modifications can also be made to the present disclosure without departing from the scope of the same. For example, while the example embodiments discussed herein describe a single BAS, it should be understood that embodiments of the present disclosure may be used in a distributed, multiple-BAS used by a centralized or enterprise-level control system. One example of an enterprise-level BAS suitable for use with the disclosed techniques is the Trane Tracer™ ES sold by Trane International Inc.

Moreover, while it has been described herein that the configuration and database information is stored to the external storage device 250, the present disclosure is not so limited. For example, it may prove advantageous to store the operating system information to the external storage device 250, such that if a hardware failure occurred, or if updates are applied to the various components of the BAS controller or BAS (security, drivers, etc.), the external storage device 250 could be moved/mounted to a new hardware device so that the entire system (including the operating system) can be restored on the new hardware device. In another example, it may prove advantageous to utilize remote server 160 for storage and retrieval of configuration information, database information, operating system information, and update information.

ASPECTS

It is noted that any of aspects 1-20 may be combined with each other in any suitable combination.

Aspect 1. A building automation system (BAS) controller configured for use in a BAS, the BAS controller comprising: an internal storage device for storing a first type of data and a second type of data; and a processor in operative communication with the internal storage device and configured to automatically store the first type of data and the second type of data to the internal storage device and the second type of data to an external storage device.

Aspect 2. The BAS controller in accordance with aspect 1, wherein the first type of data is operating system data including information relating to drivers of the operating system, information relating to the operating system kernel, low level files, and support features and libraries.

Aspect 3. The BAS controller in accordance with any of aspects 1-2, wherein the second type of data is configuration and database information including one of application configuration information, device configuration information, alarm history, data history, and link configuration.

Aspect 4. The BAS controller in accordance with any of aspects 1-3, wherein the internal storage device is a memory of the BAS controller.

Aspect 5. The BAS controller in accordance with any of aspects 1-4, wherein the external storage device is a secure digital (SD) card including an embedded MultiMediaCard (eMMC) chip.

Aspect 6. The BAS controller in accordance with any of aspects 1-5, wherein the second data is encrypted prior to being stored to the external storage device.

Aspect 7. The BAS controller in accordance with any of aspects 1-6, wherein the recipient address is determined, at least in part, based upon the time of day at which the alarm assistance message is transmitted.

Aspect 8. A method of operating a building automation system (BAS) using a BAS controller, the method comprising: determining when a change in second data occurs; and when a change in second data occurs, automatically storing first data and the second data to an internal storage device of the BAS controller and storing the second data to an external storage device.

Aspect 9. The method in accordance with aspect 8, wherein automatically storing the first data to the internal storage device includes storing operating system data including information relating to drivers of the operating system, information relating to the operating system kernel, low level files, and support features and libraries.

Aspect 10. The method in accordance with any of aspects 8-9, wherein automatically storing the second data to the external storage device includes storing configuration and database information including one of application configuration information, device configuration information, alarm history, data history, and link configuration.

Aspect 11. The method in accordance with any of aspects 8-10, further comprising using a memory of the BAS controller for the internal storage device.

Aspect 12. The method in accordance with claim 8-11, further comprising using a secure digital (SD) card including an embedded MultiMediaCard (eMMC) chip for the external storage device.

Aspect 13. The method in accordance with any of aspects 8-12, further comprising encrypting the second data prior to storing it to the external storage device.

Aspect 14. A building automation system (BAS) controller configured for use in a BAS, the BAS controller comprising: an internal storage device for storing a first type of data and a second type of data; and a processor in operative communication with the internal storage device and configured to automatically store the first type of data and the second type of data to the internal storage device and the second type of data to an external storage device.

Aspect 15. The BAS in accordance with aspect 14, wherein the first type of data is operating system data including information relating to drivers of the operating system, information relating to the operating system kernel, low level files, and support features and libraries.

Aspect 16. The BAS in accordance with any of aspects 14-15, wherein the second type of data is configuration and database information including one of application configuration information, device configuration information, alarm history, data history, and link configuration.

Aspect 17. The BAS in accordance with any of aspects 14-16, wherein the internal storage device is a memory of the BAS controller.

Aspect 18. The BAS in accordance with any of aspects 14-17, wherein the external storage device is a secure digital (SD) card including an embedded MultiMediaCard (eMMC) chip.

Aspect 19. The BAS in accordance with any of aspects 14-18, wherein the second data is encrypted prior to being stored to the external storage device.

Aspect 20. The BAS in accordance with any of aspects 14-19, wherein the recipient address is determined, at least in part, based upon the time of day at which the alarm assistance message is transmitted.

Particular embodiments of the present disclosure have been described herein, however, it is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in any appropriately detailed structure.

What is claimed is:

1. A building automation system (BAS) controller configured for use in a BAS, the BAS controller comprising:
    a first interface to an internal storage device;
    a second interface to an external storage device; and
    a processor, in operative communication with the first interface and the second interface, that executes executable instructions stored in a memory of the BAS controller to facilitate performance of operations comprising:
        in response to determining that a condition is satisfied:
            storing first data determined to be of a first type to the internal storage device;
            storing second data determined to be of a second type that differs from the first type to the internal storage device; and
            in response to the second data being determined to be of the second type, storing the second data to the external storage device.

2. The BAS controller in accordance with claim 1, wherein the first type of data is operating system data including information relating to drivers of an operating system, information relating to an operating system kernel, low level files, or support features or libraries.

3. The BAS controller in accordance with claim 1, wherein the second type of data is configuration or database information including one of application configuration information, device configuration information, alarm history, data history, and link configuration.

4. The BAS controller in accordance with claim 1, wherein the internal storage device is the memory of the BAS controller.

5. The BAS controller in accordance with claim 1, wherein the external storage device is a secure digital (SD) card including an embedded MultiMediaCard (eMMC) chip.

6. The BAS controller in accordance with claim 1, wherein the operations further comprise encrypting the second data prior to the storing of the second data to the external storage device.

7. The BAS controller in accordance with claim 1, wherein the determining the condition is satisfied comprises determining that a change in the second data has occurred.

8. A method of operating a building automation system (BAS) using a BAS controller for storing first data and second data, the method comprising:
    determining, by the BAS controller, that a change in the second data occurs, wherein the second data is determined to be of a different type than the first data; and
    in response to the determining that the change in second data occurs, performing, by the BAS controller, a storing procedure comprising:
        storing the first data and the second data to an internal storage device of the BAS controller; and
        storing the second data, that is determined to be of the different type, to an external storage device.

9. The method in accordance with claim 8, wherein storing the first data to the internal storage device includes storing operating system data including information relating to drivers of the operating system, information relating to the operating system kernel, low level files, and support features and libraries.

10. The method in accordance with claim 8, wherein storing the second data to the external storage device includes storing configuration and database information including one of application configuration information, device configuration information, alarm history, data history, and link configuration.

11. The method in accordance with claim 8, further comprising using a memory of the BAS controller for the internal storage device.

12. The method in accordance with claim 8, further comprising using a secure digital (SD) card including an embedded MultiMediaCard (eMMC) chip for the external storage device.

13. The method in accordance with claim 8, further comprising encrypting the second data prior to the storing the second data to the external storage device.

14. A building automation system (BAS) having a BAS controller, comprising;
    an internal storage device;
    an interface to an external storage device; and
    a processor, in operative communication with the internal storage device and the interface, that executes executable instructions stored in a memory of the BAS to facilitate performance of operations, comprising:
        in response to determining that a condition is satisfied:
            storing first data determined to be of a first type to the internal storage device;
            storing second data determined to be of a second type that differs from the first type to the internal storage device; and
            in response to the second data being determined to be of the second type, storing the second data to the external storage device.

15. The BAS in accordance with claim 14, wherein the first type of data is operating system data including information relating to drivers of the operating system, information relating to the operating system kernel, low level files, and support features and libraries.

16. The BAS in accordance with claim 14, wherein the second type of data is configuration and database information including one of application configuration information, device configuration information, alarm history, data history, and link configuration.

17. The BAS in accordance with claim 14, wherein the internal storage device is the memory of the BAS.

18. The BAS in accordance with claim 14, wherein the external storage device is a secure digital (SD) card including an embedded MultiMediaCard (eMMC) chip.

19. The BAS in accordance with claim 14, wherein the operations further comprise encrypting the second data prior to the storing of the second data to the external storage device.

20. The BAS in accordance with claim 14, wherein the determining the condition is satisfied comprises determining that a change in the second data has occurred.

* * * * *